United States Patent [19]

Takahashi et al.

[11] 4,408,490
[45] Oct. 11, 1983

[54] ANGULAR VELOCITY SENSOR

[75] Inventors: Fumitaka Takahashi, Houya; Hiroshi Gotoh, Asaka, both of Japan

[73] Assignee: Honda Giken Kogyo Kabushiki Kaisha, Tokyo, Japan

[21] Appl. No.: 230,039

[22] Filed: Jan. 30, 1981

[30] Foreign Application Priority Data

Mar. 27, 1980 [JP] Japan .................................. 55-39492

[51] Int. Cl.³ ............................................. G01P 15/08
[52] U.S. Cl. .................. 73/497; 73/516 LM
[58] Field of Search .................. 73/497, 515, 516 LM, 73/382 R, 431

[56] References Cited

U.S. PATENT DOCUMENTS

| 2,303,845 | 12/1942 | Krasnow | 73/382 |
|---|---|---|---|
| 2,855,495 | 10/1958 | Grant | 73/497 X |
| 3,173,297 | 3/1965 | Thompson | 73/382 |
| 4,020,699 | 5/1977 | Schaffer | 73/516 LM |
| 4,020,700 | 5/1977 | Lopiccolo et al. | 73/516 LM |

Primary Examiner—James J. Gill
Attorney, Agent, or Firm—Lyon & Lyon

[57] ABSTRACT

A heating wire is wound around a casing within which a sensor body is placed. Thermo-sensitive switch means is connected to the heating wire, which is responsive to the temperature within the casing to control the rate at which electric current is supplied to the heating wire so as to keep the temperature at a constant value. The casing may be placed within an airtight housing which is made of an insulating material. A further heating wire may be arranged on the inner wall of the airtight housing, which is controlled by further thermo-sensitive switch means so as to keep the temperature within the housing at a constant value.

4 Claims, 3 Drawing Figures

ANGULAR VELOCITY SENSOR

BACKGROUND OF THE INVENTION

This invention relates to improvements in or to an angular velocity sensor for detecting the angular velocity of an object through deflection of a gas flow.

Angular velocity sensors generally called "gas rate sensors" are used in the course adjustment or position control of a ship, an automotive vehicle, etc. Those angular velocity sensors are more resistant to vibrations than gyrocompasses and are capable of detecting the angular velocity of a ship or an automotive vehicle with higher sensitivity and more excellent responsiveness than gyrocompasses.

An angular velocity sensor in general comprises a casing, a sensor body mounted within the casing and including a nozzle and a gas flow sensor composed of thermosensitive elements and a cover covering the opening of the casing and forming part of the wall of a pumping chamber defined within the casing. Such angular velocity sensor operates for detecting the angular velocity of an object in which it is mounted, in such a manner that a gas supplied from the pumping chamber is jetted toward the thermo-sensitive elements through the nozzle. A change in the output of the gas flow sensor which is caused by deflection of the gas stream under the influence of angular velocity movement of the object is detected to thereby determine the angular velocity value.

In a conventional angular velocity sensor, the sensor body is comprised of a cylindrical sleeve, a nozzle piece secured to one end of the sleeve and formed therein with a nozzle hole at a diametrical center thereof and a gas flow sensor holder secured on the other end of the sleeve for holding a gas flow sensor composed of a pair of thermo-sensitive elements arranged symmetrically with respect to the diametrical center of the sleeve. A gas flow jetted toward the thermo-sensitive slements through the nozzle hole is deflected due to external angular velocity movement of an object applied to the angular velocity sensor, which results in a difference between the values of radiant heat of the gas stream sensed by the two thermo-sensitive elements. The resulting outputs of the two thermo-sensitive elements are different from each other by an amount corresponding to the actual angular velocity. The angular velocity of the object is thus detected.

Since, as mentioned above, the angular velocity sensors of this kind are adapted to detect the value of angular velocity applied thereto in response to a fine difference between the gas radiant heat amounts which the two thermo-sensitive elements undergo, a change in the ambient temperature can have a detrimental influence upon the angular velocity detecting action of the angular velocity sensor as a factor of disturbance to deteriorate the detecting accuracy.

Further, if the two thermo-sensitive elements are made of heating wires, the difference in output between the two elements is very small, which necessitates the use of high-gain amplifiers in connection with the elements. Such amplifiers are conventionally placed within the casing. However, since those amplifiers have their performances greatly influenced by the ambient temperature, measures are desired for keeping the amplifiers from the influence of a change in the ambient temperature.

OBJECT OF THE INVENTION

It is therefore an object of the invention to provide an angular velocity sensor in which a casing with a built-in sensor body has its internal temperature kept constant so that the sensor body can be kept from the influence of a change in the ambient temperature, to thereby exhibit an enhanced detecting accuracy.

The above and other objects, features and advantages of the invention will be more apparent from the ensuing detailed description taken in connection with the accompanying drawings, in which:

DETAILED DESCRIPTION

A preferred embodiment of the invention will now be described by way of example and with reference to the accompanying drawings.

Figure 1:
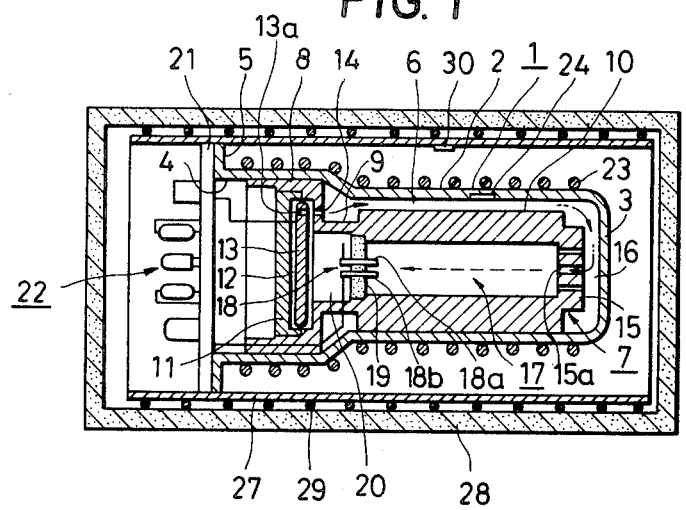
FIG. 1 is a longitudinal sectional view of an angular velocity sensor according to an embodiment of the invention.

Referring now to FIG. 1, reference numeral 1 designates a casing which is formed of a one-piece structure and includes a hollow cylindrical trunk portion 2 with its one end close by an end wall 3. The other end of the trunk portion 2 is open as an opening 4 which has its peripheral edge formed with an annular flange 5 radially outwardly extending.

Figure 2:
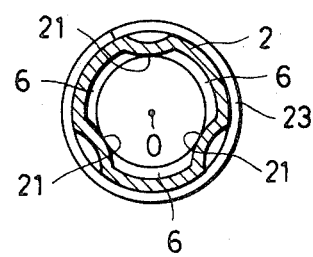
FIG. 2 is a cross sectional view of the casing shown in FIG. 1.

The above trunk portion 2 has three protuberances 21, 21, 21 arranged at circumferentially equal intervals and projected toward the diametrical center 0 of the trunk portion and axially extending, as is clear from FIG. 2 illustrating a cross section of the trunk portion. When a sensor body 7, hereinafter referred to, is mounted within the casing 1, axial gas flow passages 6 are defined between adjacent ones of the protuberances 21, 21, 21 and associated outer peripheral surfaces of a cylindrical portion 10 of the sensor body 7.

The sensor body 7, which is mounted within the casing 1, is formed of a one-piece structure, wherein a gas flow sensor holding portion 8, the above-mentioned cylindrical portion 10 and a neck portion 9 intervening therebetween are integrally formed. A shroud plate 11 is fitted within the holding portion 8 to define a pumping chamber 12 within the holding portion 8. Placed in this pumping chamber 12 is a piezo-plate 13 which has an orifice 13a adapted to vibrate upon energization when supplied with electric current to serve as a pumping element. The cylindrical portion 10 has its one end formed integrally with a nozzle piece 15 which has a nozzle hole 15a axially formed at its diametrical center. A gas flow passage 16 is formed between the nozzle piece 15 and the end wall 3 of the casing 1 in communication with the above-mentioned gas flow passages 6. An axially extending cavity 17 is formed within the cylindrical portion 10 of the sensor body 7, which serves as an internal gas flow passage. A pair of thermo-sensitive elements 18a, 18b forming a gas flow sensor 18 are mounted in the cavity at its end adjacent the neck portion 9, by means of a holder 19 fitted therein, in an arrangement diametrically symmetrical with respect to the axis of the nozzle hole 15a. The neck portion 9 has an internal space 20 serving as an exhaust gas chamber which communicates with the cavity 17 via through holes, not shown, formed in the holder 19. An amplifier assembly 22 is mounted on a plate 21a which is arranged adjacent the flange 5 of the casing 1 and electrically connected to the thermo-sensitive elements 18a, 18b.

With the above arrangement, when the piezo-plate 13 vibrates upon energization, gas within the space on the left side of the piezo-plate 13 in the pumping chamber 12 is compressed to be discharged through the orifice 13a in the piezo-plate 13 and a discharge port 14 formed in the holding portion 8 into the gas flow passages 6 around the cylindrical portion 10 and then fed into the gas flow passage 16. The gas thus delivered into the gas flow passage 16 is jetted toward the thermo-sensitive elements 18a, 18b in the internal gas flow passage 17 through the nozzle hole 15a. Then, it passes through the through holes in the holder 19 and the exhaust gas chamber 20 into the right side space in the pumping chamber 12. The gas is then sucked into the left side space in the same chamber 12 through the orifice 13a when the piezo-plate 13 is displaced rightward during vibration. During the above travel of gas flow, when the angular velocity sensor is given angular velocity due to angular velocity movement of an object in which it is mounted, the gas stream in the internal gas flow passage 17 is deflected to cause a slight difference between the outputs of the two thermo-sensitive elements 18a, 18b, which difference is amplified by the amplifier assembly 22 and supplied to the outside.

Figure 3:
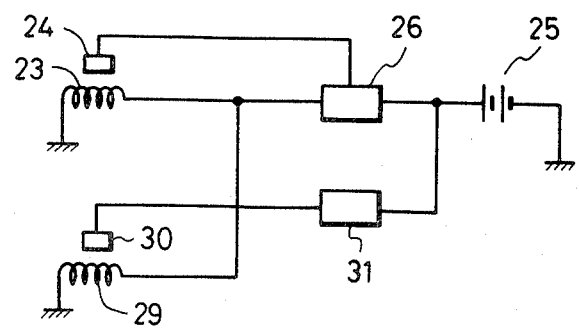
FIG. 3 is a circuit diagram showing an example of electrical connection between the temperature sensor shown in FIG. 1 and its related elements.

According to the invention, a sheathed heating wire 23 is helically wound around the casing 1 along the substantially whole length of same, as illustrated in FIGS. 1 and 2. This heating wire 23 is connected to a power source 25 in FIG. 3 for heating the casing 1 when supplied with electric current therefrom. The temperature within the casing 1 can be adjusted by varying the rate at which electric current is supplied to and flows in the sheathed heating wire 23. To this end, preferably a temperature sensor 24 may be mounted in the inner wall of the casing 1 as shown in FIG. 1, which may be connected to a suitable switch means such as one 26 shown in FIG. 3 so that the switch means 26 performs a repeated switching action in response to a detected temperature signal supplied thereto from the sensor 24 so as to keep the temperature within the casing 1 at a desired value.

Further, according to the invention, the casing 1 may be placed within a cylindrical support member 27 in concentricity therewith in such a manner that the casing 1 is supported by the support member 27 at its flange 5 fitted therein, and also the support member 27 is placed within an airtight housing 28 which is formed of an insulating material. A further sheathed heating wire 29 is helically wound around the support member 27 in a manner similar to the aforementioned sheathed heating wire 23 so that the support member 27 supports the housing 28 via the sheathed heating wire 29. Also the heating action of this sheathed heating wire 29 should preferably be controlled by suitable switch means such as one 31 shown in FIG. 3 which is connected to another temperature sensor 30 mounted in the inner wall of the support member 27 as shown in FIG. 1, so that the switch means 31 performs a repeated switching action in response to a detected temperature signal of the sensor 30 to keep the temperature within the housing 28 at a constant value. In this manner, the space temperature $T_C$ within the casing 1 which is obtained by the heating action of the sheathed heating wire 24 and the space temperature $T_H$ within the housing 28 which is obtained by the heating action of the sheathed heating wire 29 can be maintained at their respective desired predetermined values. Preferably, if the predetermined values for $T_C$ and $T_H$ are selected so as to satisfy the relationship of $T_C > T_H$, a damping effect can be obtained that a change in the space temperature $T_C$ within the casing 1, which is caused by a change in the ambient temperature outside the housing 25, can be kept much smaller as compared with the change in the ambient temperature. The values of $T_C$ and $T_H$ should preferably be 65° C. and 60° C., respectively. In addition, the arrangement of the heating wires 23, 29, respectively, on the casing 1 and the support barrel 27 in a manner being helically wound thereon over substantially whole lengths thereof can enhance the stability of the temperatures $T_C$ and $T_H$.

The pair of the temperature sensor 24 and the switch means 26 and the pair of the temperature sensor 30 and the switch means 31 may each be formed of one body, if they are each formed of a thermostat, a thermo switch or the like.

Obviously many modifications and variations of the present invention are possible in the light of the above teachings. It is therefore to be understood that within the scope of the appended claims in the invention many be practiced otherwise than as specifically described.

What is claimed is:

1. An angular velocity sensor comprising: a casing, a sensor body placed within said casing, said sensor body having at least part of an outer peripheral surface thereof disposed in direct contact with said casing, said sensor body being formed with a nozzle hole, a gas flow sensor mounted within said sensor body and disposed to detect the temperature of a gas flow delivered thereto through said nozzle hole, said gas flow sensor being disposed to produce an output varying with deflection of said gas flow which is caused by angular velocity applied to said angular velocity sensor, a heating wire helically wound around said casing along substantially the whole length thereof and disposed in direct contact with said casing, thermo-sensitive switch means connected to said heating wire and arranged to detect the temperature within said casing and control the supply of electric current to said heating wire, said thermo-sensitive switch means being operable to control the rate at which electric current is supplied to said heating wire in response to the temperature within said casing so as to keep said temperature at a constant value, an airtight housing formed of an insulating material, said casing positioned within said housing, a second heating wire helically wound on an inner wall of said housing, a second thermo-sensitive switch means arranged to detect the temperature within said housing and control the supply of electric current to said second heating wire, said second thermo-sensitive switch means being operable to control the rate of electric current being supplied to said second heating wire in response to the temperature within said housing so as to keep said temperature at a constant value, and said two thermo-sensitive switch means being operable to control the respective temperatures within said casing and said housing so that the temperature within said casing is higher than the temperature with said housing.

2. An angular velocity sensor comprising: a casing, a sensor body placed within said casing, said sensor body having at least part of an outer peripheral surface thereof disposed in direct contact with said casing, said sensor body being formed with a nozzle hole, a gas flow sensor mounted within said sensor body and disposed to detect the temperature of a gas flow delivered thereto through said nozzle hole, said gas flow sensor being disposed to produce an output varying with deflection of said gas flow which is caused by angular velocity applied to said angular velocity sensor, a heating wire helically wound around said casing along substantially the whole length thereof and disposed in direct contact with said casing, and thermo-sensitive switch means connected to said heating wire and arranged to detect the temperature within said casing and control the supply of electric current to said heating wire, said thermo-sensitive switch means being operable to control the rate at which electric current is supplied to said heating wire in response to the temperature within said casing so as to keep said temperature at a constant value, an airtight housing formed of an insulating material, a substantially hollow and cylindrical support member extending the length of and positioned inside said housing, said casing mounted in said support member, a portion of said support member extending beyond the casing, a second heating wire helically would on the exterior of said support member for substantially the whole length thereof and positioned interiorly of said housing, second thermo-sensitive switch means arranged to detect the temperature within said housing and control the supply of electric current to said second heating wire, said second thermo-sensitive switch means being operable to control the rate of electric current being supplied to said second heating wire in response to the temperature within said housing so as to keep said temperature at a constant value, and amplifier means connected to said gas flow sensor for amplifying an output thereof, said amplifier means being arranged within said extending portion of said support member whereby said second heating wire has a portion thereof surrounding said amplifier means for maintaining said amplifier means at a substantially constant temperature.

3. The angular velocity sensor as claimed in claim 1 or 2, wherein said thermo-sensitive switch means includes a temperature sensor mounted in an inner wall of said casing.

4. The angular velocity sensor as claimed in claim 1 or 2, wherein said second thermo-sensitive switch means includes a temperature sensor mounted in an inner wall of said housing.

* * * * *

UNITED STATES PATENT AND TRADEMARK OFFICE
CERTIFICATE OF CORRECTION

PATENT NO. : 4,408,490

DATED : October 11, 1983

INVENTOR(S) : Fumitaka Takahashi and Hiroshi Gotoh

It is certified that error appears in the above—identified patent and that said Letters Patent is hereby corrected as shown below:

Column 1, line 40 change "slements" to "elements".

Signed and Sealed this

First Day of May 1984

[SEAL]

Attest:

GERALD J. MOSSINGHOFF

Attesting Officer     Commissioner of Patents and Trademarks